US012769290B2

(12) United States Patent
Webb et al.

(10) Patent No.: US 12,769,290 B2
(45) Date of Patent: Oct. 20, 2026

(54) APPARATUSES, COMPUTER-IMPLEMENTED METHODS, AND COMPUTER PROGRAM PRODUCTS FOR PROCESSING MULTIPLE REPRESENTATIONS OF A PROCESSING PLANT

(71) Applicant: Honeywell International Inc., Charlotte, NC (US)

(72) Inventors: Christopher J. Webb, Scottsdale, AZ (US); Joseph Z. Lu, Glendale, AZ (US); Kiran Raviprakash, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 795 days.

(21) Appl. No.: 18/184,300

(22) Filed: Mar. 15, 2023

(65) Prior Publication Data

US 2024/0036556 A1 Feb. 1, 2024

(30) Foreign Application Priority Data

Jul. 30, 2022 (IN) ............................ 202211043709

(51) Int. Cl.
*G05B 19/418* (2006.01)

(52) U.S. Cl.
CPC .................. *G05B 19/41835* (2013.01); *G05B 2219/41108* (2013.01)

(58) Field of Classification Search
None
See application file for complete search history.

(56) References Cited

U.S. PATENT DOCUMENTS 7,953,584 B2 5/2011 Rashid
8,447,423 B2 5/2013 Budiman et al.
(Continued)

FOREIGN PATENT DOCUMENTS

CN 101694571 B 4/2011
CN 112947325 A 6/2021
WO 2012/162141 A2 11/2012

OTHER PUBLICATIONS

Fani Boukouvala et al., "Data-Driven Modeling and Global Optimization of Industrial-Scale Petrochemical Planning Operations," 2016 American Control Conference (ACC), 3340-3345, (Jul. 6, 2016). (Year: 2016).*

(Continued)

*Primary Examiner* — Matthew D Krcha
(74) *Attorney, Agent, or Firm* — Alston & Bird LLP

(57) ABSTRACT

Embodiments of the present disclosure provide for generation and use of multiple representations of a processing plant, for example a refinery plant. In some embodiments a first representation is utilized to visualize the component(s) and/or connection(s) of the processing plant, with a second representation utilized to process one or more aspect(s) of the processing plant. The first representation in some embodiments represents the physical components and/or connections between such components to enable intuitive visualization and monitoring of the components thereof. The second representation in some embodiments represents a virtualized representation of the physical components and/or connections between such components in a manner that is better processable via one or more computing process(es). Such processing is performable to generate data for controlling configuration and/or operation of component(s) in the processing plant.

18 Claims, 10 Drawing Sheets

(56) References Cited

U.S. PATENT DOCUMENTS

| | | | |
|---|---|---|---|
| 8,788,068 | B2 | 7/2014 | Kocis et al. |
| 9,733,629 | B2 | 8/2017 | Lu |
| 11,687,064 | B2 | 6/2023 | De et al. |
| 2012/0003623 | A1 | 1/2012 | Bartee et al. |
| 2012/0296690 | A1 | 11/2012 | Varvarezos et al. |
| 2019/0332101 | A1 | 10/2019 | Castillo Castillo et al. |
| 2021/0132596 | A1 | 5/2021 | Lu |
| 2022/0057786 | A1 | 2/2022 | Phan et al. |

OTHER PUBLICATIONS

Communication about intention to grant a European patent Mailed on Apr. 24, 2025 for EP Application No. 23185052, 6 page(s).

SA Office Action Mailed on May 13, 2025 for SA Application No. 123450068, 15 page(s).

Werner Kritzinger et al., "Digital Twin in manufacturing: A categorical literature review and classification," IFAC PapersOnLine, 51(11):1016-1022, (2018).

Carlos A. Mendez et al., "Optimization Techniques for Blending and Scheduling of Oil-Refinery Operations," Carnegie Mellon University, 41 pages, (2004). [Retrieved from the Internet Aug. 2, 2023: URL: <http://egon.cheme.cmu.edu/Papers/CarlosBlendingABBPaper-pub.pdf>].

Fupei Li et al., "Development and challenges of planning and scheduling for petroleum and petrochemical production," Frontiers of Engineering Management, vol. 7, No. 3, pp. 373-383, (2020). [Retrieved from the Internet Aug. 2, 2023: URL: <https://journal.hep.com.cn/fem/EN/article/downloadArticleFile.do?attachType=PDF&id=27598>].

Jaime Cerdá, "Optimization Methods for Batch Scheduling," Instituto de Desarrollo Tecnológico para la Industria Química, 98 pgs., (Jul. 2005). [Retrieved from the Internet Aug. 2, 2023: URL: <http://cepac.cheme.cmu.edu/pasilectures/cerda/cerdalecture.pdf>].

Luping Zhao et al., "Batch Process Monitoring Based on Quality-Related Time-Batch 2D Evolution Information," Sensors, vol. 22, No. 2235, 22 pgs., (2022). [Retrieved from the Internet Aug. 2, 2023: URL: <https://www.mdpi.com/1424-8220/22/6/2235/pdf?version=1647328086>].

Nikolaos Rakovitis et al., "A new approach for scheduling of multipurpose batch processes with unlimited intermediate storage policy," Frontiers of Chemical Science and Engineering, vol. 13, No. 4, pp. 784-802, (2019). [Retrieved from the Internet Aug. 2, 2023: URL: <https://link.springer.com/content/pdf/10.1007/s11705-019-1858-4.pdf>].

Pedro A. Castillo Castillo et al., "Global Optimization of Nonlinear Blend-Scheduling Problems," Engineering, vol. 3, pp. 188-201, (2017). [Retrieved from the Internet Aug. 2, 2023: URL: <https://www.sciencedirect.com/science/article/pii/S2095809917302990>].

Extended European Search Report Mailed on Dec. 12, 2023 for EP Application No. 23185052, 8 page(s).

Fani Boukouvala et al., "Data-Driven Modeling and Global Optimization of Industrial-Scale Petrochemical Planning Operations," 2016 American Control Conference (ACC), 3340-3345, (Jul. 6, 2016).

Jinmin Zhao et al., "Data-driven Wasserstein distributionally robust optimization for refinery planning under uncertainty," IECON 2021—47th Annual Conference of the IEEE Industrial Electronics Society, 1-6, (Oct. 13, 2021).

SA Office Action Mailed on Dec. 2, 2025 for SA Application No. 123450068, 20 page(s).

Decision to grant a European patent Mailed on Sep. 4, 2025 for EP Application No. 23185052, 2 page(s).

SA Notice of Allowance Mailed on Apr. 13, 2026 for SA Application No. 123450068, 2 page(s).

* cited by examiner

APPARATUSES, COMPUTER-IMPLEMENTED METHODS, AND COMPUTER PROGRAM PRODUCTS FOR PROCESSING MULTIPLE REPRESENTATIONS OF A PROCESSING PLANT

TECHNOLOGICAL FIELD

Embodiments of the present disclosure generally relate to control and visualization of processing plants, and specifically to utilizing multiple representations for control and visualization of a processing plant including an oil refinery plant.

BACKGROUND

Often, components and/or connections between components of a processing plant are visualized and monitored. Such connections and/or components may be utilized to control aspect(s) of the processing plant as it operates. The visualization of the components and/or connections should be intuitive to enable control and/or monitoring of the operations of the processing plant based on such visualization.

Applicant has discovered problems with current implementations for visualizing and controlling a processing plant. Through applied effort, ingenuity, and innovation, Applicant has solved many of these identified problems by developing embodied in the present disclosure, which are described in detail below.

BRIEF SUMMARY

In general, embodiments of the present disclosure are provided for processing multiple representations of a processing plant. Other implementations for processing multiple representations of a processing plant will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for processing multiple representations of a processing plant is provided. The computer-implemented method is performable via any of a myriad of computing device(s) embodied in hardware, software, firmware, and/or a combination thereof, as described herein, including at least one processor in communication with at least one memory. One example computer-implemented method includes identifying external representation data representing a physical layout of the processing plant, where the external representation data include a physical representation of a physical component of the processing plant. The example computer-implemented method further includes automatically generating internal representation data corresponding to the processing plant based at least in part on the external representation data. In the computer-implemented method, the internal representation data includes a plurality of virtual representations associated with the physical component of the processing plant, and each virtual representation corresponds to a modal path of a plurality of modes operable via the physical component of the processing plant.

In some embodiments of the example computer-implemented method, the example computer implemented method further includes generating at least one optimized operational parameter corresponding to at least the physical component of the processing plant based at least in part on the internal representation data.

In some such embodiments of the example computer-implemented method, the example computer implemented method further includes causing operation of the physical component based at least in part on the at least one optimized operational parameter.

In some such embodiments of the example computer-implemented method, the example computer implemented method further includes configuring a lift schedule based at least in part on the at least one optimized operational parameter.

In some such embodiments of the example computer-implemented method, the at least one optimized operational parameter corresponds to a plurality of optimized amounts including an optimized amount corresponding to each product to be generated at least in part via the physical component over a particular time interval.

In some embodiments of the example computer-implemented method, the processing plant includes a plurality of physical components corresponding to a plurality of physical representations, where the internal representation data includes a different plurality of virtual representations associated with each component of the plurality of physical components, the example computer-implemented method further including generating at least one optimized operational parameter corresponding to the plurality of physical components of the processing plant.

In some such embodiments of the example computer-implemented method, the example computer implemented method further includes causing operation of the plurality of physical components based at least in part on the at least one optimized operational parameter.

In some embodiments of the example computer-implemented method, the example computer implemented method further includes generating a user-facing interface based at least in part on the external representation data, where the user-facing interface includes at least one physical path associated with the physical representation of the physical component.

In some embodiments of the example computer-implemented method, the physical component includes a blender configurable to activate the plurality of modes associated with a batch blender.

In some embodiments of the example computer-implemented method, each modal path corresponds to a different product of a plurality of products generable via the physical component.

In some embodiments of the example computer-implemented method, the example computer implemented method further includes controlling operation of at least the physical component via a mode of the plurality of modes at a plurality of time slices.

In some embodiments of the example computer-implemented method, each virtual representation of the plurality of virtual representations associated with the physical component includes a virtual blender associated with a different product of a plurality of products generable via the physical component.

In some embodiments of the example computer-implemented method, the physical component embodies a crude flow unit.

In some embodiments of the example computer-implemented method, where the physical component includes a first physical component including a batch blender, where the processing plant includes the first physical component and a second physical component including a run-down blender, the example computer-implemented method further including causing configuration of the first physical component utilizing a batch blender optimization process that generates at least one optimized operational parameter generated based at least in part on the internal representation data, and causing configuration of the second physical component utilizing a run-down blender optimization process, where the batch blender optimization process differs from the run-down blender optimization process.

In some embodiments of the example computer-implemented method, the external representation data is embodied as a flowsheet model.

In accordance with a second aspect of the disclosure, an apparatus for processing multiple representations of a processing plant is provided. In one example embodiment the example apparatus includes at least one processor and at least one non-transitory memory having computer-coded instructions thereon. The computer-coded instructions in execution with the at least one processor cause the apparatus to perform any one of the example computer-implemented methods described herein. In another example embodiment the example apparatus includes means for performing each step of any one of the example computer-implemented methods described herein.

In accordance with a third aspect of the disclosure, a computer program product for processing multiple representations of a processing plant is provided. In one example embodiment the example computer program product includes at least one non-transitory computer-readable storage medium having computer program code thereon that, in execution with at least one processor, configures the computer program product for performing any one of the example computer-implemented methods described herein.

BRIEF DESCRIPTION OF THE DRAWINGS

Figure 1:
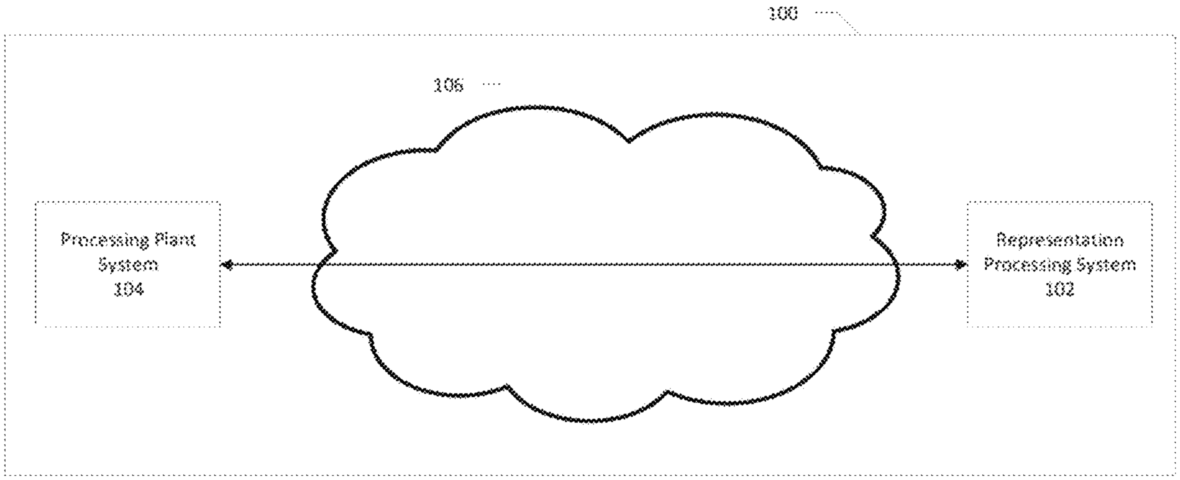
Figure 2:
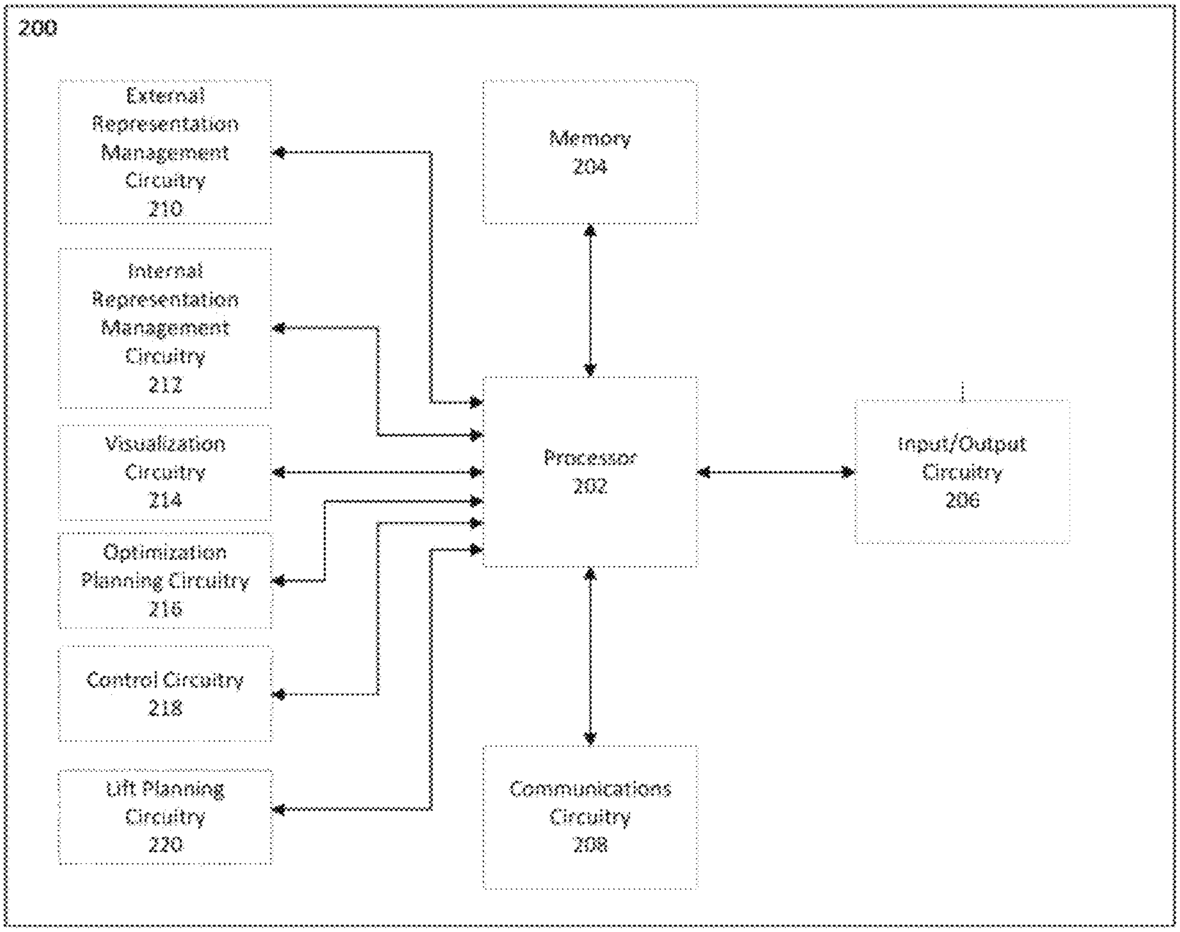
Figure 3:
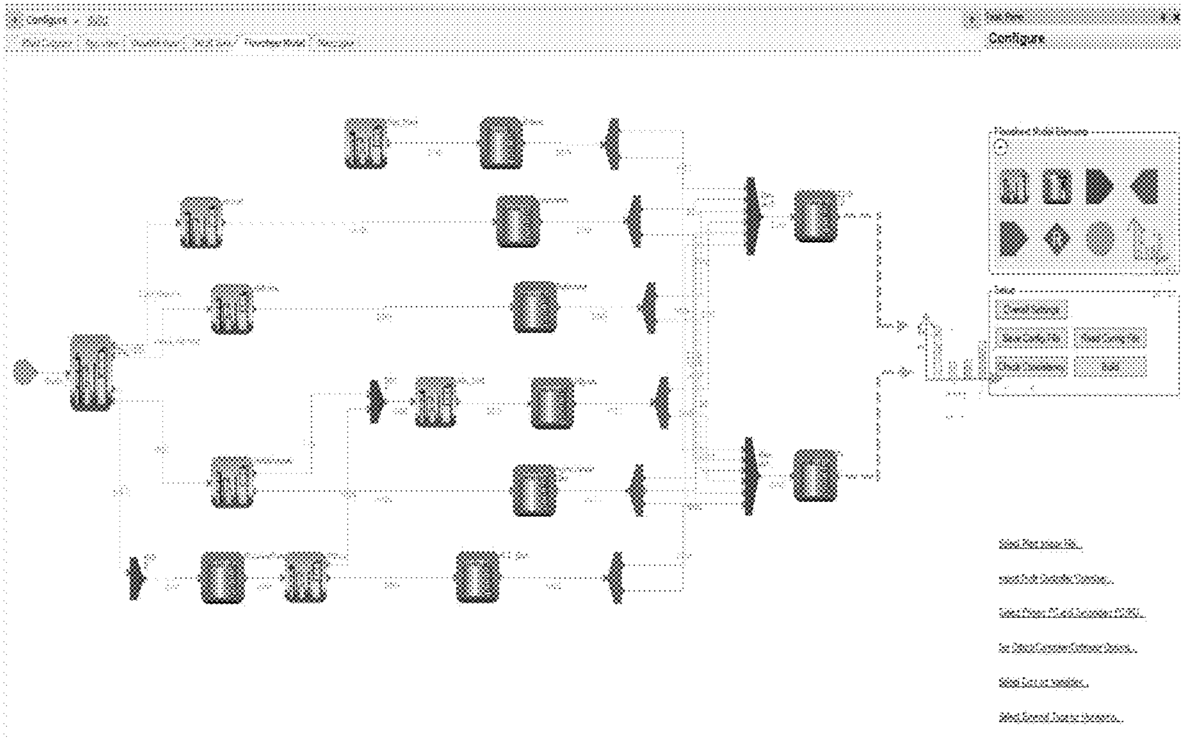
Figure 4:
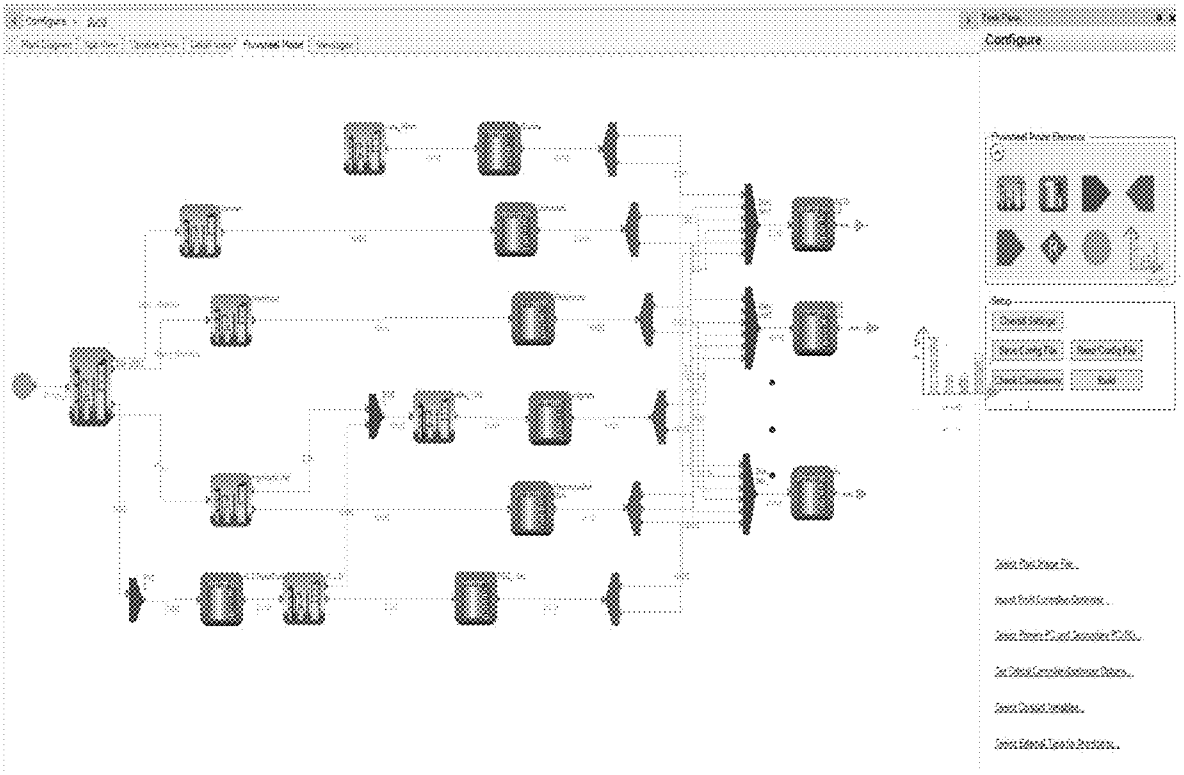
Figure 5:
Figure 6:
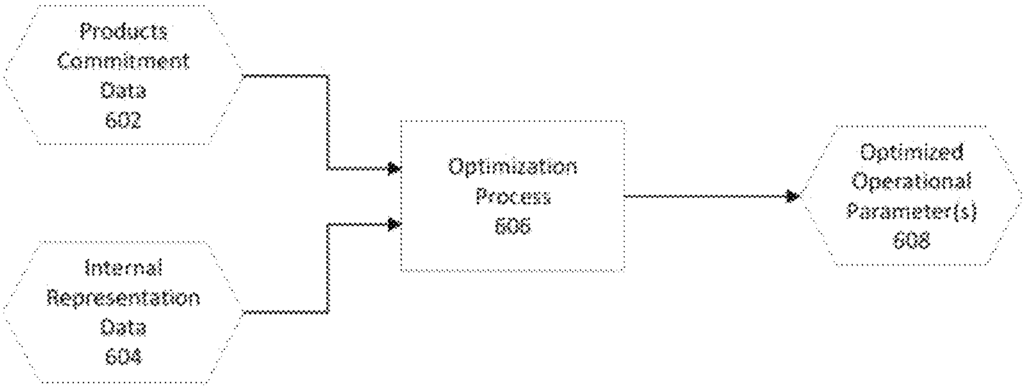
Figure 7:
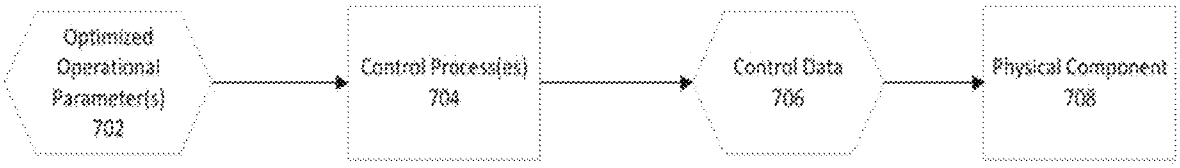
Figure 8:
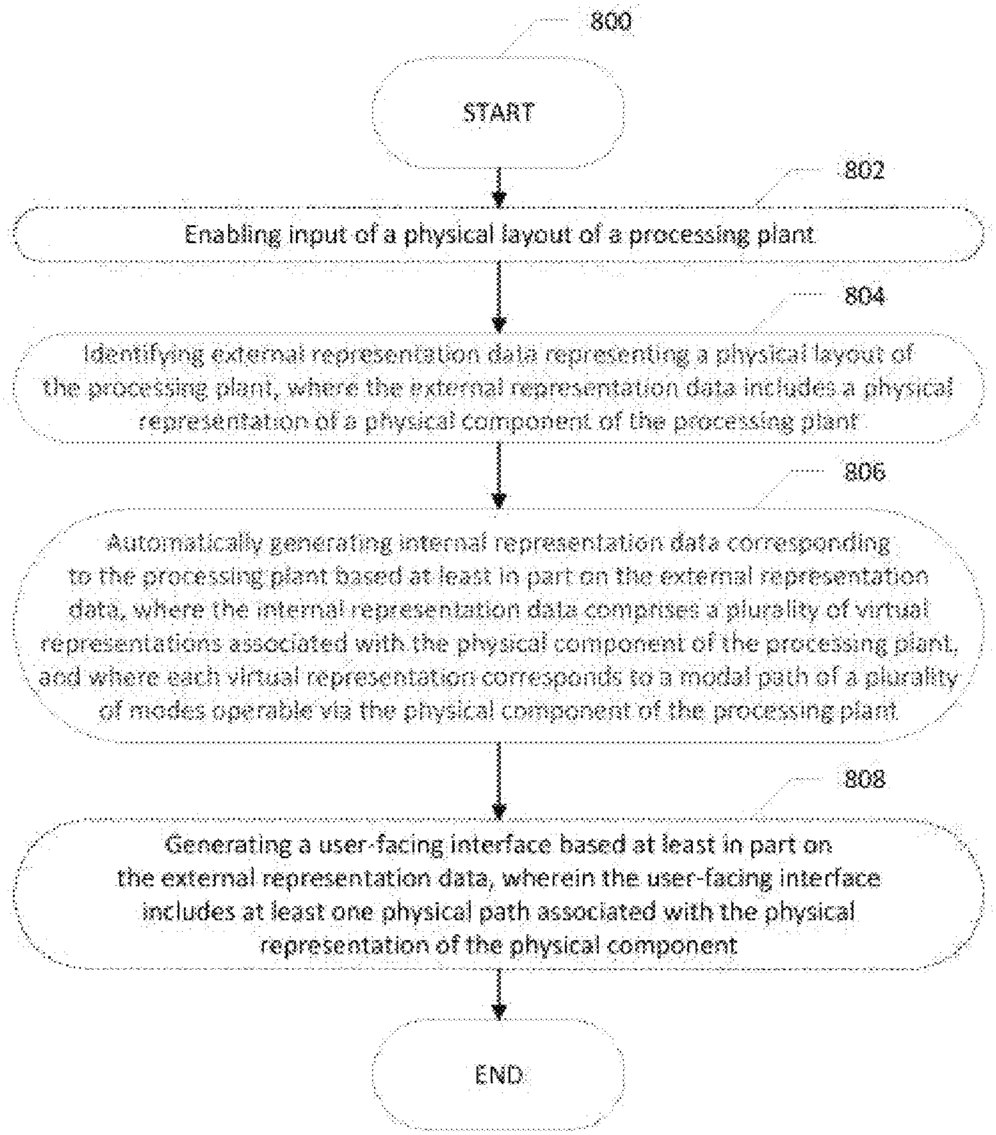
Figure 9:
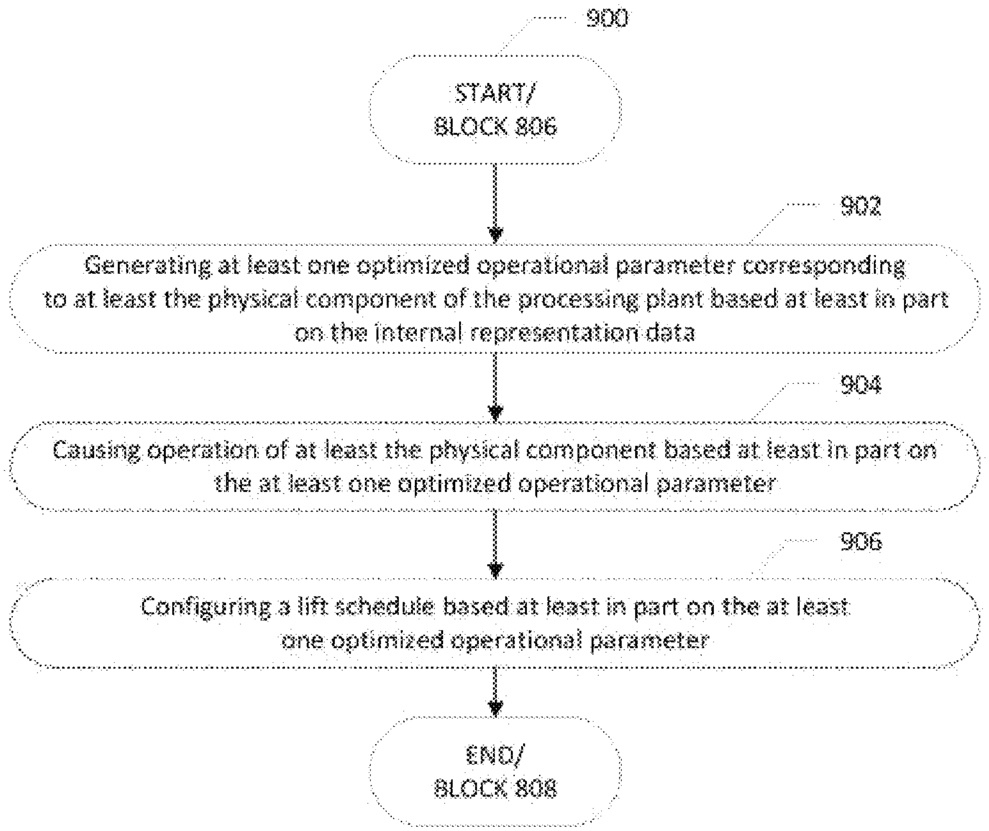
Figure 10:
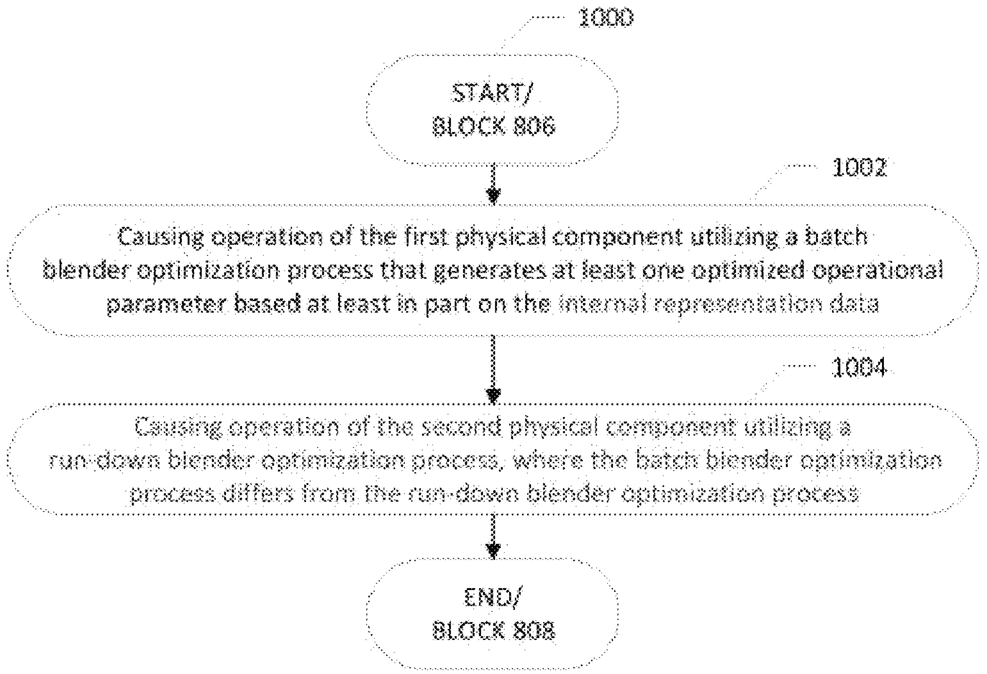

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with an example embodiment of the present disclosure;

FIG. 3 illustrates a visualization of external representation data in accordance with at least one example embodiment of the present disclosure;

FIG. 4 illustrates a visualization of internal representation data in accordance with at least one example embodiment of the present disclosure;

FIG. 5 illustrates a data flow for generating of internal representation data from external representation data in accordance with at least one example embodiment of the present disclosure;

FIG. 6 illustrates a data flow for generating optimized operational parameters in accordance with at least one example embodiment of the present disclosure;

FIG. 7 illustrates a data flow for configuring operation of a physical component in accordance with at least one example embodiment of the present disclosure;

FIG. 8 illustrates a flowchart including operations of an example process for processing multiple representations of a processing plant in accordance with at least one example embodiment of the present disclosure;

FIG. 9 illustrates a flowchart including operations of an example process for generating at least one optimized operational parameter and use of the optimized operational parameter in accordance with at least one example embodiment of the present disclosure; and FIG. 10 illustrates a flowchart including operations of an example process for causing configuration of physical components in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Systems often desire to provide intuitive methods for controlling a particular processing plant, for example an oil refinery. To accomplish this goal, a system may maintain data representing the configuration or layout of the processing plant, such that this data may be utilized to generate a user interface for visualizing and/or controlling the various components of the processing plant. Such visualizations often, however, are computationally cumbersome to process, and lack any simple method for easily and quickly computing optimization(s) and/or other pertinent determination(s) for how to control the processing plant. Alternative methods, however, may be confusing to the user utilizing the user interface, for example where a user that is presented a user interface that does not exactly match the actual layout of their processing plant is unsure what interface elements to interact with to perform desired actions. Not only does such confusion cause a slowdown in user activity, which can negatively impact the operation of the processing plant itself, it also increases a likelihood of errors, improper inputs, incorrect configurations, or other undesirable results that could cause faulty application design for and diminished operation of the processing plant, dangerous situations, or the like.

Embodiments of the present disclosure utilize a multi-representation methodology for representing a processing plant. Embodiments include an external representation defined by external representation data, and an internal representation defined by internal representation data, which are both logically equivalent transformations of one another but visually distinct and structured distinctly to provide particular technical advantages when using each representation. The external representation is visualizable in a manner that reflects the physical layout of the processing plant itself, for example including related physical components of the processing plant and physical connections between said physical components. In this regard, the external representation is renderable to generate a user-facing interface that is intuitive and readily interactable by an end user that is familiar with the processing plant. The internal representation is structured in a manner that is computationally advantageous, for example for use in executing one or more optimization process(es) that determine data usable to control the operation of the processing plant in a manner that optimizes one or more target parameters for optimization (e.g., to maximize the profit of the overall processing plant). By using the multiple representations—for example the external representation and the internal representation—in their particular advantageous circumstances, embodiments enable presentation of an intuitive user-facing interface via the external representation that represents the processing plant without exposing the less-intuitive internal representation. The less-intuitive internal representation is usable to perform optimization process(es) in a computationally advantageous manner, for example that can be completed in less time, utilize less processing resources, and/or the like, for automatic use and/or providing to the user without the user even needing to be aware of the separate representation utilized for such purposes.

Embodiments of the present disclosure address a plurality of technical problems and provide a plurality of technical advantages. For example, embodiments of the present disclosure generate particularly configured and intuitive interfaces utilizing external representation data to solve the technical problems caused by unintuitive interfaces utilized in visualizing and controlling processing plants. Additionally or alternatively, embodiments of the present disclosure improve the throughput, reduce computing resource usage, and/or otherwise entirely enable performance associated with optimization process(es) utilized to drive guided control of the processing plant. Such advantages and/or solutions are provided simultaneously without sacrificing any advantages of using either representation.

Definitions

The term "product" refers to an object or other physical combination of multiple inputs. Non-limiting examples of a product include any oil-based product, gasoline, and diesel fuel. It should be appreciated that different products include different properties and/or characteristics.

The term "processing plant" refers to any building, complex, or arrangement of components that perform a chemical, physical, electrical, or mechanical process for converting input materials into one or more output products. Non-limiting examples of a processing plant include a chemical processing plant and an oil refinery plant.

The term "physical component" refers to a real-world machine, tank, pipe, or other physical structure within a processing plant that is utilized in a process performed by the processing plant. In an example context of an oil refinery plant, non-limiting examples of a physical component include a component storage tank, a blender, a product tank, a pump, a heat exchanger, a pressure vessel, a pipe or piping system, and a valve.

The term "physical layout" refers to physical components and connections such physical components of a processing plant. In some embodiments, the physical layout of a processing plant enables a flow or other transmission of objects, liquid, and/or other flow components between particular physical components.

The term "mode" refers to a configuration of behavior utilized by a physical component that defines what process(es) the physical component is to perform and/or how the physical component performs the one or more process(es). In some embodiments, a mode of a physical component alters the inputs received by the physical component, the processes performed by the physical component to process such component(s), and/or the outputs of the physical component.

The term "physical path" refers to each physical component and connection between physical components that is utilized in a particular configuration to produce a particular product.

The term "blender" refers to specialized machinery that is configurable to receive, process, and/or combine inputs into a particular product. In one example context, a blender receives input products and processes such input products to produce a particular desired final output product.

The term "batch blender" refers to a physical component embodying a blender that is configured to utilize one or more physical connection(s) to blend one or more input(s) in a particular tank to produce a particular final output product for bulk storage as an intermediary storage tank before delivery of the final product.

The term "batch blender optimization process" refers to one or more algorithm(s), function(s), model(s), and/or other computer-executed mathematical maximizations or minimizations of one or more target value(s) during production of one or more particular amounts of final product(s) utilizing a batch blender.

The term "run-down blender" refers to a physical component embodying a blender that is configured to utilize one or more physical connection(s) to blend one or more input(s) to product a final output product that is not stored in any intermediary storage tank upon blending.

The term "run-down blender optimization process" refers to one or more algorithm(s), function(s), model(s), and/or other computer-executed mathematical maximizations or minimizations of one or more target value(s) during production of one or more particular amounts of final product(s) utilizing a run-down blender.

The term "crude flow unit" refers to a physical component that provides crude oil having determinable properties to one or more other physical component(s) based at least in part on parameter(s) having configurable value(s).

The term "external representation data" refers to electronically managed data that represents a physical layout of a processing plant. External representation data is usable to render a user interface where a component and connections between the component with other component(s) is/are depicted in a manner that matches the real-world configuration between such components. In external representation data, a physical component is representable using a single renderable element.

The term "mode" refers to a configurable behavior performed by a physical component, where the behavior alters a product produced via the physical component and/or a process utilized by the physical component to produce a particular product.

The term "modal path" refers to a flow of input and output products that are utilized by one or more physical component(s) to produce a particular final product.

The term "physical representation" refers to at least a portion of external representation data that represents a physical component or connection between two physical components in a physical layout associated with a processing plant.

The term "internal representation data" refers to electronically managed data that represents an abstraction of physical component(s) and/or connection(s) between physical components of a processing plant in a manner that separately represents different modal paths associated with modes of at least one physical component. In internal representation data, a physical component is representable using a different renderable element for each modal path associated with the physical component.

The term "virtual representation" refers to at least a portion of internal representation data that represents a particular modal path abstracted associated with a particular physical component of a processing plant.

The term "optimized operational parameter" refers to a value for a particular configurable parameter utilized to operate a physical component or connection between two physical components determined to optimize one or more target values utilizing one or more optimization model(s) and/or process(es).

The term "optimized amount" with respect to a particular product refers to an amount of a final product that is to be produced via a processing plant to optimize one or more target variables. In one example context, an optimized amount for each product of a plurality of products refers to the amount of each of such products to be produced to maximize a particular target variable, such as a profit variable.

The term "operation" with respect to a physical component refers to one or more behavior(s) performed by the physical component.

The term "lift schedule" refers to electronically managed data representing timestamps and/or timestamp intervals at or during which particular final product(s) are to be output from a processing plant. In some embodiments, a lift schedule corresponds to a pickup schedule that defines timestamps or timestamp intervals at which final products will be exported from the processing plant to another location, thus freeing up storage capacity within one or more physical component(s) of the processing plant.

The term "time interval" refers to a range of time defined by two or more timestamps.

The term "time slice" refers to electronically managed data representing a defined time interval.

The term "user-facing interface" refers to any electronically renderable visual output producible for viewing by an end user.

The term "flowsheet model" refers to a renderable format for representing physical component(s), connection(s) between said physical component(s), and/or flow of inputs and/or products between such physical component(s) utilizing one or more graph element(s).

Example Systems and Apparatuses of the Disclosure

FIG. 1 illustrates a block diagram of a system that may be specially configured within which embodiments of the present disclosure may operate. Specifically, FIG. 1 depicts an example system 100. As illustrated, the system 100 includes a processing plant system 104 in communication with an representation processing system 102. In some embodiments, the processing plant system 104 communicates with the representation processing system 102 over one or more communications network(s), for example a communications network 106.

It should be appreciated that the communications network 106 in some embodiments is embodied in any of a myriad of network configurations. In some embodiments, the communications network 106 embodies a public network (e.g., the Internet). In some embodiments, the communications network 106 embodies a private network (e.g., an internal localized, or closed-off network between particular devices). In some other embodiments, the communications network 106 embodies a hybrid network (e.g., a network enabling internal communications between particular connected devices and external communications with other devices). The communications network 106 in some embodiments includes one or more base station(s), relay(s), router(s), switch(es), cell tower(s), communications cable(s) and/or associated routing station(s), and/or the like. In some embodiments, the communications network 106 includes one or more user controlled computing device(s) (e.g., a user owned router and/or modem) and/or one or more external utility devices (e.g., Internet service provider communication tower(s) and/or other device(s)).

Each of the components of the system 100 communicatively coupled to transmit data to and/or receive data from one another over the same or different wireless and/or wired networks embodying the communications network 106. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 106, the various embodiments are not limited to this architecture. In other embodiments, one or more computing entities share one or more components, hardware, and/or the like, or otherwise are embodied by a single computing device such that connection(s) between the computing entities are over the communications network 106 are altered and/or rendered unnecessary. For example, in some embodiments, the processing plant system 104 includes some or all of the representation processing system 102, such that an external communications network 106 is not required.

In some embodiments, the processing plant system 104 and the representative processing system 102 are embodied in an on-premises system within or associated with the processing plant. In some such embodiments, the processing plant system 104 and the representative processing system 102 are communicatively coupled via at least one wired connection. Alternatively or additionally, in some embodiments, the processing plant system 104 embodies or includes the representative processing system 102, for example as a software component of a single enterprise terminal.

The processing plant system 104 includes any number of computing device(s), system(s), physical component(s), and/or the like, that facilitates producing of any number of products, for example utilizing particular configurations that cause processing of particular inputs available within the processing plant system 104. In some embodiments, the processing plant system 104 includes one or more physical component(s), connection(s) between physical component(s), and/or computing system(s) that control operation of each physical component therein. In one example context, the processing plant system 104 embodies a refinery plant, which includes physical component(s) embodying blender(s), intermediary storage tank(s), processing tank(s) or other component(s) that perform particular process(es) to alter properties of inputs to the component, crude flow unit(s), piping between such physical component(s), valve(s) controlling flow between the physical component(s), and/or the like. Additionally, the refinery plant includes one or more computing system(s) that are specially configured to operate the physical component(s) in a manner that produces one or more particular product(s) simultaneously. In some embodiments, a processing plant system 104 includes one or more computing device(s) and/or system(s) embodied in hardware, software, firmware, and/or a combination thereof, that configure and/or otherwise control operation of one or more physical component(s) in the processing plant. For example, in some embodiments, such computing device(s) and/or system(s) include one or more programmable logic controller(s), application server(s), centralized control system(s), and/or the like, that control(s) configuration and/or operation of at least one physical component. It will be appreciated that different processing plant system(s) 104 may include different physical component(s), computing system(s), and/or the like. For example, different refinery plants may include different components, different number of components, different types of components, and/or the like, that cause the processing plant system to operate differently from other refinery plants.

The representation processing system 102 includes one or more computing device(s) and/or system(s) embodied in hardware, software, firmware, and/or a combination thereof, that generates and/or processes representation data associated with a particular processing plant. In some embodiments, a representation processing system 102 includes one or more specially configured application server(s), database server(s), end user device(s), cloud computing system(s), and/or the like. Additionally or alternatively, in some embodiments, the representation processing system 102 includes one or more client devices, user devices, and/or the like, that enables access to functionality provided via the representation processing system 102, for example via a web application, native application, and/or the like.

In some embodiments, the representation processing system 102 is configured to generate, maintain, and/or otherwise process one or more representation(s) of a processing plant. For example, in some embodiments, the representation processing system 102 generates and/or processes external representation data associated with a processing plant system 104. Additionally or alternatively, in some embodiments, the representation processing system 102 generates and/or processes internal representation data associated with the processing plant system 104. Additionally or alternatively, in some embodiments, the representation processing system 102 determines, generates, and/or otherwise identifies particular data utilized to control operation of the physical component(s) of or associated with the processing plant system 104. In some embodiments, the representation processing system 102 includes or embodies a display or other user interface to which a user-facing interface is renderable.

In some embodiments, the representation processing system 102 and/or processing plant system 104 communicate with one another to perform the various actions described herein. For example, in some embodiments, the representation processing system 102 and the processing plant system 104 to identify external representation data representing a physical layout of the processing plant associated with the processing plant system 104. Additionally or alternatively, in some embodiments, the representation processing system 102 and the representation processing system 102 automatically generate internal representation data for a processing plant associate with the processing plant system 104. Additionally or alternatively, in some embodiments, the representation processing system 102 and/or the processing plant system 104 generate at least one optimized operational parameter for a particular processing plant. Additionally or alternatively, in some embodiments, the representation processing system 102 and/or the processing plant system 104 configure operation of at least one physical component based at least in part on optimized operational parameter(s) corresponding to at least one physical component of the processing plant.

FIG. 2 illustrates a block diagram of an example apparatus that may be specially configured in accordance with at least one example embodiment of the present disclosure. Specifically, FIG. 2 depicts an example representation processing apparatus 200 ("apparatus 200") specially configured in accordance with at least some example embodiments of the present disclosure. In some embodiments, the representation processing system 102 and/or a portion thereof is embodied by one or more system(s), such as the apparatus 200 as depicted and described in FIG. 2. The apparatus 200 includes processor 202, memory 204, input/output circuitry 206, communications circuitry 208, external representation management circuitry 210, internal representation management circuitry 212, visualization circuitry 214, optional optimization planning circuitry 216, optional control circuitry 218, and optional lift planning circuitry 220. In some embodiments, the apparatus 200 is configured, using one or more of the sets of circuitry 202, 204, 206, 208, 210, 212, 214, 216, 218, and/or 220, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with outputting degradation indicator(s) associated with an asset based on received data associated with generating and/or processing one or more representation(s) associated with a processing plant. In some embodiments, the processor 202 includes hardware, software, firmware, and/or a combination thereof, that identifies external representation data representing a physical layout of a processing plant. Additionally or alternatively, in some embodiments, the processor 202 includes hardware, software, firmware, and/or a combination thereof, that generates internal representation corresponding to a processing plant based at least in part on the external representation data corresponding to that processing plant. Additionally or alternatively, in some embodiments, the processor 202 includes hardware, software, firmware, and/or a combination thereof, that generates a user-facing interface based at least in part on the external representation data. Additionally or alternatively, in some embodiments, the processor 202 includes hardware, software, firmware, and/or a combination thereof, that processes the internal representation data to generate one or more portion(s) of data therefrom, for example optimized operational parameter(s).

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

The external representation management circuitry 210 includes hardware, software, firmware, and/or a combination thereof, that supports receiving, generating, and/or managing external representation data corresponding to a particular processing plant. For example, in some embodiments, the external representation management circuitry 210 includes hardware, software, firmware, and/or a combination thereof, that identifies external representation data corresponding to a particular processing plant. Alternatively or additionally, in some embodiments, the external representation management circuitry 210 includes hardware, software, firmware, and/or a combination thereof, that enables input of external representation data corresponding to a processing plant. In some such embodiments, the external representation management circuitry 210 includes hardware, software, firmware, and/or a combination thereof, that enables input of data into a flowsheet model that represents the physical layout of the processing plant, where such a flowsheet model represents the external representation data. Alternatively or additionally, in some embodiments, the external representation management circuitry 210 includes hardware, software, firmware, and/or a combination thereof, that receives external representation data from a datastore or external system. In some embodiments, external representation management circuitry 210 includes a separate processor, specially configured field programmable gate array (FPGA), or a specially programmed application specific integrated circuit (ASIC).

The internal representation management circuitry 212 includes hardware, software, firmware, and/or a combination thereof, that supports various functionality associated with receiving, generating, and/or managing internal representation data corresponding to a particular processing plant. For example, in some embodiments, the internal representation management circuitry 212 includes hardware, software, firmware, and/or a combination thereof, that automatically generates internal representation data corresponding to a processing plant based at least in part on external representation data corresponding to the processing plant. In some such embodiments, the internal representation data includes a plurality of virtual representation associated with a physical component of the processing plant. Each virtual representation may correspond to a different modal path of a plurality of modes operable via the physical component. Additionally or alternatively, in some embodiments, the internal representation management circuitry 212 includes hardware, software, firmware, and/or a combination thereof, that maintains the internal representation data in a separate format and/or data object than the corresponding external representation data for the same processing plant. In some embodiments, the internal representation management circuitry 212 includes a separate processor, specially configured field programmable gate array (FPGA), or a specially programmed application specific integrated circuit (ASIC).

The visualization circuitry 214 includes hardware, software, firmware, and/or a combination thereof, that supports various functionality associated with generating and/or outputting a user-facing interface associated with a processing plant. For example, in some embodiments, the visualization circuitry 214 includes hardware, software, firmware, and/or a combination thereof, that generates a user-facing interface based at least in part on external representation data associated with a processing plant, for example where the user-facing interface represents a physical layout of a processing plant. Additionally or alternatively, in some embodiments, the visualization circuitry 214 includes hardware, software, firmware, and/or a combination thereof, that renders a flowsheet model including external representation data. In this regard, the visualization circuitry 214 may produce or otherwise cause rendering of a user-facing interface that intuitively matches the physical layout of the processing plant. In some embodiments, the visualization circuitry 214 includes a separate processor, specially configured field programmable gate array (FPGA), or a specially programmed application specific integrated circuit (ASIC).

The optional optimization planning circuitry 216 includes hardware, software, firmware, and/or a combination thereof, that supports various functionality associated with generating optimized operational parameter(s) associated with a processing plant. For example, in some embodiments, the optimization planning circuitry 216 includes hardware, software, firmware, and/or a combination thereof, that generates at least one optimized operational parameter corresponding to at least one physical component of the processing plant. Additionally or alternatively, in some embodiments, the optimization planning circuitry 216 includes hardware, software, firmware, and/or a combination thereof, that generates at least one optimized operational parameter corresponding to a plurality of physical components of a processing plant. Additionally or alternatively, in some embodiments, the optimization planning circuitry 216 includes hardware, software, firmware, and/or a combination thereof, that generates at least one optimized operational parameter associated with a batch blender using a batch blender optimization process based at least in part on the internal representation data. Additionally or alternatively, in some embodiments, the optimization planning circuitry 216 includes hardware, software, firmware, and/or a combination thereof, that generates at least one optimized operational parameter associated with a run-down blender based at least in part on the internal representation data. In some embodiments, the optimization planning circuitry 216 includes a separate processor, specially configured field programmable gate array (FPGA), or a specially programmed application specific integrated circuit (ASIC).

The optional control circuitry 218 includes hardware, software, firmware, and/or a combination thereof, that supports various functionality associated with causing configuration or other causing operation of at least one physical component of a processing plant. For example, in some embodiments, the control circuitry 218 includes hardware, software, firmware, and/or a combination thereof, that causes operation of a physical component based at least in part on at least one optimized operational parameter. Additionally or alternatively, in some embodiments, the control circuitry 218 includes hardware, software, firmware, and/or a combination thereof, that causes operation of a plurality of physical components based at least in part on at least one optimized operational parameter. Additionally or alternatively, in some embodiments, the control circuitry 218 includes hardware, software, firmware, and/or a combination thereof, that configures at least one physical component of a processing plant to produce a plurality of optimized amounts corresponding to a plurality of products over a particular time interval. In some embodiments, the control circuitry 218 includes a separate processor, specially configured field programmable gate array (FPGA), or a specially programmed application specific integrated circuit (ASIC).

The optional lift planning circuitry 220 includes hardware, software, firmware, and/or a combination thereof, that supports various functionality associated with configuring a lift schedule. For example, in some embodiments, the lift planning circuitry 220 includes hardware, software, firmware, and/or a combination thereof, that enables configuration of a lift schedule by assigning a time slices to particular lift of a final product available at that time slice. Additionally or alternatively, in some embodiments, the lift planning circuitry 220 includes hardware, software, firmware, and/or a combination thereof, that enables configuration of the lift schedule based at least in part on the at least one optimized operational parameter and/or an optimized amount of each product of a plurality of products. Additionally or alternatively, in some embodiments, the lift planning circuitry 220 includes hardware, software, firmware, and/or a combination thereof, that generates a user-facing interface that enables input of a planned lift (e.g., a scheduled pickup of a particular product) at a particular times slice. In some embodiments, the lift planning circuitry 220 includes a separate processor, specially configured field programmable gate array (FPGA), or a specially programmed application specific integrated circuit (ASIC).

Additionally or alternatively, in some embodiments, two or more of the sets of circuitries 202-220 are combinable. Alternatively or additionally, in some embodiments, one or more of the sets of circuitry perform some or all of the functionality described associated with another component. For example, in some embodiments, two or more of the sets of circuitry 202-220 are combined into a single module embodied in hardware, software, firmware, and/or a combination thereof. Similarly, in some embodiments, one or more of the sets of circuitry, for example the external representation management circuitry 210, the internal representation management circuitry 212, the visualization circuitry 214, the optimization planning circuitry 216, the control circuitry 218, and/or the lift planning circuitry 220, is/are combined with the processor 202, such that the processor 202 performs one or more of the operations described above with respect to each of these sets of circuitry 210-220.

Example Processing Plant Representations of the Disclosure

Having described example systems and apparatus, example representations of a processing plant in accordance with the present disclosure will now be described. In some embodiments, the representations as depicted and described are associated with corresponding representation data, for example external representation data and/or internal representation data. In some embodiments, one or more specially configured system(s) and/or device(s), for example the representation processing system 102 embodied by the apparatus 200, identifies, generates, and/or otherwise maintains data representing such depicted representation(s). Additionally or alternatively, in some embodiments, the representation processing system 102 embodied by the apparatus 200, for example, is configured to enable generation a user-facing interface depicting such representation(s).

FIG. 3 illustrates a visualization of external representation data in accordance with at least one example embodiment of the present disclosure. Specifically, FIG. 3 illustrates a visualization of a flowsheet model 300. The flowsheet model 300 includes or otherwise depicts external representation data corresponding to a particular processing plant. In some embodiments, the flowsheet model 300 is renderable to a particular user-facing interface.

In some embodiments, the flowsheet model 300 includes external representation data that depicts a physical layout of the processing plant. In this regard, the flowsheet model 300 in some embodiments includes a physical representation of each physical component of the processing plant, and/or each connection between the physical components of the processing plant. In this regard, each physical component may correspond to a particular physical representation within the flowsheet model 300, and similarly each physical connection between physical components may correspond to a particular physical representation within the flowsheet model 300.

In one example context, the processing plant embodies a specially configured refinery plant, for example that includes a physical layout of various physical components and physical connections between such physical components to enable production of one or more final product(s). The physical layout of the processing plant may be represented by external representation data depicted in the flowsheet model 300. As illustrated, the flowsheet model includes a physical representation for each of a plurality of processing units within the refinery plant. Each processing unit may perform a particular process that receives inputs and processes such inputs to create an output product. The output product may be propagated through a connection to a subsequent physical component, for example for further processing. As illustrated, the flowsheet model 300 includes a physical representation 302A corresponding to a gas plant processing unit, a physical representation 302B corresponding to a isomerization processing unit, a physical representation 302C corresponding to a reformer processing unit, a physical representation 302D corresponding to a crude distillation unit and/or vacuum distillation unit (CDU_VDU), a physical representation 302E corresponding to an alkylation processing unit, a physical representation 302F corresponding to a hydrocracker processing unit, and a physical representation 302G corresponding to a fluid catalytic cracking processing unit. In this regard, each of the physical representations 302A-302G in some embodiments corresponds to a single physical component within the processing plant.

Each of such physical components may be configurable to operate in accordance with a single mode, or in some embodiments a selected mode from a plurality of modes. Similarly, the physical components may be connected via one or more physical connection(s) as depicted in the flowsheet model 300. For example, the CDU_VDU corresponding to physical representation 302D depicts connections to the isomerization processing unit corresponding to physical representation 302B and the reformer processing unit corresponding to physical representation 302C, indicating such physical components are connected via one or more physical connection(s) within the processing plant. It will be appreciated that different products generated by the processing units may be directed via different physical connections, for example such that light naphtha is routed via physical connections from the CDU_VDU to the isomer processing unit, and that heavy naphtha is routed from the CDU_VDU to reformer processing unit.

In addition to the processing units, the flowsheet model 300 includes a plurality of physical representations corresponding to additional and/or alternative physical component(s) within the processing plant. Such additional and/or alternative physical component(s) may include intermediary storage tank(s) that store one or more intermediary product(s) utilized as input by a subsequent downstream physical component. As illustrated for example, the flowsheet model 300 includes an intermediary storage tank 304 that stores a product utilized as an input fed to the FCCU corresponding to the physical representation 302G (e.g., AGO from the CDU_VDU). Similarly, the flowsheet model includes a physical representation 306A corresponding to a butane intermediary storage tank, a physical representation 306B corresponding to an isomerate intermediary storage tank, a physical representation 306C corresponding to a reformate intermediary storage tank, a physical representation 306D corresponding to an alkylate intermediary storage tank, a physical representation 306E corresponding to a hydrocracker gas intermediary storage tank, a physical representation 306F corresponding to a fluid catalytic cracking gas intermediary storage tank. It should be appreciated that such intermediary storage tanks may similarly be connected via physical connection(s) to one or more other physical component(s) that supply an input product to the intermediary storage tank, and/or receive an output product from the intermediary storage tank.

In some embodiments, the flowsheet model 300 further includes a physical representation corresponding to each blender in the processing plant. For example, as illustrated, the flowsheet model 300 includes physical representation 308A corresponding to a first blender of the processing plant, and physical representation 308B corresponding to a second blender of the processing plant. At any given time slice, each blender may be configured to produce a particular final product. In this regard, each blender may draw particular input component(s) corresponding to a particular recipe that defines the particular final product to be produced. Additionally, the batch blender may store the final product until a lift is performed at a particular scheduled timestamp, where the final product is offloaded from the batch blender (e.g., to a customer).

In some embodiments, at least one blender, or in some embodiments each blender, embodies a batch blender. The batch blender is configurable via one or more mode(s) to create a particular final product. Changing configuration of the blender (e.g., to a new mode) may cause the blender to produce a different final product in accordance with the newly selected mode. In this regard, one may update the operation of the batch blender by altering a mode utilized by the batch blender for operation to select a new mode of a plurality of candidate or otherwise selectable modes of operation.

It will be appreciated that each physical representation 308A and 308B corresponding to a batch blender, for example, is associated with a myriad of physical paths that correspond to inputs from other physical component(s) corresponding by physical representation(s) in the flowsheet model 300 to the blender. Such physical paths may be configured, altered, or otherwise manipulated (e.g., by increasing or decreasing a flow of inputs between physical components of the processing plant) to alter the final product produced via the batch blender.

The flowsheet model 300 in some embodiments intuitively conveys the physical layout of the processing plant. In this regard, physical components are represented by particular physical representations in a manner that directly reflects their existence in the physical processing plant itself. In this regard, presentation of the flowsheet model 300 to a user-facing interface enables a user to readily ascertain exactly the connections and operation between the various physical component(s) of the processing plant, as each physical component and connection therebetween is represented by a single corresponding physical representation. However, performing computational modeling and/or predictions based on the physical layout represented in the flowsheet model 300 may remain difficult. Such is particularly the case where another dimensional variable (e.g., time) is introduced to determine how the processing plant should operate (e.g., what products should be made to maximize a particular parameter, such as profit, while producing at least committed amounts of each final product.

FIG. 4 illustrates a visualization of internal representation data in accordance with at least one example embodiment of the present disclosure. Specifically, FIG. 4 illustrates a visualization of a flowsheet model 400. The flowsheet model 400 includes or otherwise depicts internal representation data corresponding to a particular processing plant. In this regard, in some embodiments the flowsheet model 400 includes virtual representation(s) corresponding to one more physical representation(s) as depicted and described with respect to the flowsheet model 300 in FIG. 3. For example, in some embodiments, the physical representation(s) corresponding to the processing units, intermediary storage tanks, and/or other non-blender physical components may include a single corresponding virtual representation in the flowsheet model 400, which are depicted but not marked to maintain visual clarity.

The flowsheet model 400 includes a plurality of virtual representations 402 corresponding to the blenders represented by physical representations 308A and 308B. Specifically, the plurality of virtual representations 402 includes virtual representations 402A, 402B, and 402N. It will be appreciated as illustrated that the plurality of virtual representations 402 may include any number of virtual representations, for example represented by 402A-402N where N is any number.

In some embodiments, the apparatus 200 automatically generates the virtual representations 402 based at least in part on the type and/or configuration of each of the batch blenders in the processing plant. For example, in some embodiments, each batch blende is configurable operate in accordance with a selected mode of a plurality of selectable modes, and the apparatus 200 may generate a virtual representation corresponding to a model path for each mode of the plurality of selectable modes. In this regard, each modal path may correspond to a particular recipe of inputs received by the batch blender to generate a particular desired final product when in that selected mode. In some such embodiments, the apparatus 200 thereby generates virtual representations for each batch blender that each correspond to the particular final product produced in a particular mode. For example, in a circumstance where a batch blender is configurable between 5 modes to make one of 5 selectable final products, the apparatus 200 may generate 5 virtual representations corresponding to that batch blender. In a circumstance where the batch blender corresponding to the physical representation 308A is configurable to a selected mode of 5 selectable modes, and the batch blender corresponding to the physical representation 308A is configurable to a selected mode of 3 selectable modes, the apparatus 200 may generate 5 virtual representations corresponding to the batch blender 508A and 3 virtual representations corresponding to the batch blender 508B. In this regard, it will be appreciated that the number of virtual representations may not match the number of physical representations represented in corresponding external representation data, and/or may not match the number of physical components in the processing plant.

It will be appreciated that in other embodiments, virtual representation(s) may be generated for any other physical component(s) in the processing plant. For example, in some embodiments, any other physical component that is configurable between different modes of operation may be associated with virtual representations corresponding to each of the different modes. In some embodiments, a crude flow unit is associated with different virtual representations corresponding to the different modes of operating the crude flow unit, for example.

The internal representation data represented in the flowsheet 400 may be less intuitive to an end user than the corresponding flowsheet model 300 that represents corresponding external representation data. It should be appreciated however that the virtual representations represent an abstracted transformation of the same physical component depicted via a physical representation in the corresponding external representation data. In this regard, the internal representation data and the external representation data represent the same operable processing plant.

In some contexts, the external representation data depicts a more intuitive representation of the processing plant itself. For example, as the external representation data is generated in a manner that matches a physical layout of the processing plant, a user may more readily identify the corresponding physical representations in the external representation data that corresponds to the actual physical component. The internal representation data includes additional and/or alternative virtual representations of a given physical component, such that the number of virtual representations in the internal representation data may exceed the actual number of physical components in the processing plant. This difference may confuse a user if presented with the internal representation data without a proper understanding of what such data is representing. The internal representation data, however, is processable in alternative and advantageous manners over the corresponding external representation data. By abstracting a batch blender based on its various modes into multiple virtual representations, for example, such internal representation data is processable in a manner that better optimizes for particular target parameter(s) in a time-agnostic manner (e.g., determination of what final products would best optimize profit over the next m-days without necessarily defining when each portion of such products needs to be generated), may be generated in a computationally advantages manner that reduces the time complexity and/or computing resources required to complete the optimization process based on each distinct modal path corresponding to the virtual representations, and/or the like. In this regard, embodiments of the present disclosure may provide multiple technical advantages by generating intuitive user-facing interfaces including external representation data that may be readily assessed by an end user, and utilizing the internal representation data to improve the technical process(es) of optimizing for one or more target parameter(s) without the user needing to be exposed to the possibly more-confusing internal representation data.

Example Data Flows of the Disclosure

Having described example systems, apparatuses, data representations, and visualizations in accordance with the disclosure, example data flows of the disclosure will now be discussed. In some embodiments, each data flow is performed within one or more computing environment(s) maintained by the apparatus(es) and/or system(s) described herein. For example, in some embodiments, a representation processing system 102 embodied by the apparatus 200 maintains such computing environment(s) to perform the data flow(s) described herein. In this regard, in some embodiments the apparatus 200 maintains the data structure(s), data object(s), and/or instruction(s) to perform the data flow(s) as depicted and described.

FIG. 5 illustrates a data flow for generating of internal representation data from external representation data in accordance with at least one example embodiment of the present disclosure. In this regard, in some embodiments the apparatus 200 utilizes the data flow as depicted and described to automatically, and/or in response to user input, generate internal representation data from external representation data. In some embodiments, the apparatus 200 utilizes particular external representation data associated with a particular processing plant to generate corresponding internal representation data associated with the same processing plant. For example, in some embodiments, the external representation data and/or internal representation data is stored associated with a particular user account associated with or corresponding to a particular processing plant, and/or stores a particular plant identifier associated with the external representation data and/or internal representation data that uniquely identifies the particular processing plant corresponding to such data.

As illustrated, the apparatus 200 identifies external representation data 502 for processing. The external representation data 502 in some embodiments represents the physical layout of a particular processing plant. In this regard, in some embodiments the external representation data 502 includes physical representation(s) of each physical component in the particular processing plant and/or connection(s) between the physical component(s), thus representing a physical layout of the processing plant. In some embodiments, an end-user associated with the processing plant or administrator associated with the apparatus 200 inputs the external representation data 502. Additionally or alternatively, in some embodiments, the apparatus 200 retrieves a stored external representation data 502, for example from one or more databases based at least in part on a user account identifier and/or plant identifier.

In some embodiments, the external representation data 502 further includes current or real-time configuration data for one or more physical component(s). For example, in a circumstance where a physical component may be activated in a selected mode of a plurality of selectable modes, the external representation data 502 in some embodiments indicates the currently active mode. For example, in some embodiments where a batch blender is operating, the blender is not dedicated to production of a single product—but rather switches to a particular mode corresponding to a particular end product. Each mode may be associated with a unique set of operating constraints, for example different mixing models or recipes for a particular final product. Such a batch blender may function as a non-continuous blender for such purposes.

The apparatus 200 applies the external representation data to a virtualization process 504. As illustrated, the virtualization process 504 generates internal representation data 506 corresponding to the external representation data 502. In some embodiments, the internal representation data 506 includes one or more virtual representation(s) corresponding to a physical component of the processing plant, and/or connection(s) between such physical component(s) and one or more other physical component(s) relevant to a corresponding virtual component. In some embodiments for example, the internal representation data 506 includes a modal path representing a particular configuration of a physical component for each mode of at least each physical component embodying a batch blender in the processing plant, and/or each configuration of one or more downstream and/or upstream physical component(s) utilized within the modal path to produce a particular final product.

In some embodiments, the virtualization process 504 generates one or more virtual representations corresponding to each physical representation in the external representation data 502. For example, in some embodiments, the apparatus utilizes a virtualization process 504 that generates a different virtual object corresponding to each selectable mode for each batch blender corresponding to a particular physical representation in the external representation data 502. In one example context, the virtualization process 504 determines how many configurable modes are associated with a particular batch blender represented by a particular physical representation, and generates a single virtual representation embodies in the internal representation data 506 that corresponds to a particular selectable mode for that batch blender. In this regard, a batch blender having 3 selectable modes of operation (e.g., to produce 3 different final products) may be represented as a single physical representation in the external representation data 502, and may be represented as 3 virtual representations within the internal representation data 506 after completion of the virtualization process 504. In some embodiments, the number of virtual representations corresponding to a particular physical representation in the external representation data 502 corresponds to the number of final products that the corresponding physical component may be reconfigured to produce, or otherwise contribute towards producing. In some embodiments, the apparatus 200 stores the internal representation data 506 (e.g., in a memory onboard or otherwise accessible to the apparatus 200) for subsequent use, for example in performing one or more optimization process(es) as described further herein.

In some embodiments, the external representation data 502 represents a flowsheet model. Additionally or alternatively, in some embodiments, the virtualization process 504 generates internal representation data 506 similarly representing a flowsheet model. In this regard, the flowsheet models corresponding to each of the external representation data 502 and the internal representation data 506 may not be the same (e.g., the internal representation data 506 may include one or more additional virtual representations), but are logically equivalent. In this regard, the external representation data 502 in some embodiments visually indicates the plurality of selectable modes associated with a physical component corresponding to a particular physical representation, which is similarly represented by a plurality of corresponding virtual representations associated with that physical component in the internal representation data 506.

In one example context, for example, a single, physical representation corresponding to a batch blender in external representation data is replaced in the corresponding internal representation data with virtual representations corresponding to a virtual product blender and a virtual tank. Each virtual blender and tank pair is dedicated to production of a single product. The output from the process units upstream is divided between these virtual product blenders and tan pairs. Based on the optimization of the desired parameter, for example the economics to maximize profit of the overall processing plant, more or less material may be dedicated to each product. In this regard, each virtual blender and tank pair is treated as continuous blenders where their throughput is determined by the overall economics.

As such, the relationship between a physical representation of such a blender, for example, and the corresponding virtual representations interact in two ways. First, the fraction of the individual product throughput to the overall throughput determines the amount of time the physical blender is dedicated to production of that product. This determines a time slice that effectively controls the amount (or size) of individual product batches. Second, as each product is being produced, the mixing models along with the blend-specific corrections to those models associated with the product may be saved via the apparatus 200. These corrections are appliable to the individual virtual representations of the blender on a per-final-product basis. Consequently, a single physical blender represented as a physical representation can update the models for several products based on the realization of individual batches.

Alternatively or additionally, in another example context, a crude flow unit may be encapsulated into various virtual representations from external representation data to internal representation data. Often, for example, a crude unit is the first processing unit and involves the distillation of raw crude into several intermediate streams. The type of crude being refined determines in large part the amount of each intermediate stream generated. Some refineries have a very stable crude supply, whereas others may purchase or otherwise source crude from several different sources, with each individual crude portion altering the operation of the crude unit.

In some embodiments, a single crude flow source represented by a physical representation in external representation data is replaced by a virtualization process with a series of virtual representations embodying virtual crude units, with each virtual crude unit dedicated to a single crude source. The underlying operating constraints, along with the product levels and proxy limits, may be maintained by the apparatus 200 separately for each virtual crude unit based on its own physical realization. The outputs of the virtual crude unit are combined and routed to the downstream physical components (e.g., other processing units).

In a manner similar to the blender virtualization described above, the overall optimization process may be based on the optimization of one or more target parameter(s) affected by the crude involved, for example optimization of profit due to economics of the crude sources. As each crude source is priced differently and yields different volumes of intermediate product, the optimization process performed plant-wide must include the cost of the crude, the intermediate yields associated with the crude, and the overall operating constraints of the crude flow unit itself. In this regard, the optimization process may be utilized to determine whether crudes are most favorable for processing to maximize the desired target parameter(s) (e.g., profit of the overall processing plant). Such processing actively considers the throughput capacity constraints associated with the real, physical blenders represented in the processing plant. Such optimization processes may catch if crude is favorably priced but limits the crude unit throughput such that a more expensive crude that does not limit throughput is favorable, for example.

FIG. 6 illustrates a data flow for generating optimized operational parameters in accordance with at least one example embodiment of the present disclosure. Specifically, FIG. 6 illustrates a data flow for generating at least one optimized operational parameter utilizing an optimization process that relies at least in part on products commitment data and internal representation data.

In some embodiments products commitment data indicates a particular amount of final products that must be satisfied within a particular timestamp interval. For example, in some embodiments, the products commitment data 602 indicates a certain amount of particular final products that were requested, purchased, or otherwise indicated as required within a particular timestamp interval (e.g., the next m-days, where m is a number). Such products commitment data 602 may be input by a user, derivable from one or more documents or other data available to the apparatus 200, previously stored in a datastore accessible to the apparatus 200, and/or the like. In some embodiments, the products commitment data 602 includes an amount for each product capable of being produced by the processing plant. In other embodiments, the products commitment data 602 includes an amount for each product that was indicated as committed within a particular timestamp interval. In one example context of an oil refinery, for example, the products commitment data 602 represents particular volumes of particular petroleum-based fuels for which purchase orders were received and processed for the next m-days, such as 5 days. It should be appreciated that in this regard, products commitment data 602 serves as a minimum amount of a particular final product to be made within the particular timestamp interval.

The products commitment data 602 is applied to an optimization process 606 together with an internal representation data 604. In some embodiments, the internal representation data 604 includes virtual representation(s) corresponding to physical component(s) of the processing plant, for example corresponding to each modal path associated with a different mode of operation for the physical component to generate a different final product (e.g., a batch blender, or a crude flow unit for example in some embodiments). In some embodiments, the internal representation data 604 embodies or includes the internal representation data generated and/or otherwise derived based at least in part on corresponding external representation data, for example as described herein with respect to FIG. 5.

The optimization process 606 processes the products commitment data 602 and the internal representation data 604 to generate optimized operational parameter(s) 608. In some embodiments, the optimized operational parameter(s) 608 includes one or more operational parameter(s), or a plurality of optimized operational parameters. In some embodiments, the optimized operational parameter(s) includes or embodies an optimized amount corresponding to a particular product that is determined to be produced in a particular timestamp interval to optimize (e.g., maximize and/or minimize) one or more particular target parameter(s) for optimization. For example, in some embodiments, the optimized operational parameter(s) 608 maximize a profit target parameter, indicating that production of the optimized amounts represented by such optimized operational parameter(s) 608, for example, is indicated to maximize the profit that would be generated by the processing plant. It will be appreciated that in other embodiments, other target parameter(s) may be optimized. For example, the optimized operational parameter(s) may minimize cost, minimize waste of input products, optimize a particular combination of target parameter(s), and/or the like.

In some embodiments, the optimization process 606 generates particular optimized operational parameter(s) 608 that may be utilized to configure physical components of a processing plant to optimize one or more target parameter(s), for example profit generated by the processing plant overall. In some embodiments, the optimization process 606 processes at least the products commitment data 602 and the internal representation data 604 to determine particular product allocation for a plurality of candidate final products to be produced via the processing plant, where the optimized operational parameter(s) 608 represent such allocations. In some embodiments, the optimization process 606 processes additional and/or alternative input data, for example financial data regarding costs and/or values of input products, values of final products, related constraint information for operating the physical components of the processing plant, time interval data, and/or the like, to generate the optimized operational parameter(s) 608. It should be appreciated that the optimization process 606 may utilize any number of sub-process(es), algorithm(s), function(s), model(s)—including statistical, mathematical, algorithmic, machine learning, artificial intelligence, and/or other models—and/or the like to generate the optimized operational parameter(s) 608 based at least in part on such data. Non-limiting examples of optimization processes are described in U.S. Ser. No. 17/084,480, filed Oct. 29, 2020, and titled "PLANT-WIDE OPTIMIZATION INCLUDING BATCH OPERATIONS," and U.S. Pat. No. 9,733,629, filed Jul. 21, 2014, and titled "CASCADED MODEL PREDITIVE CONTROL (MPC) APPROACH FOR PLANTWIDE CONTROL AND OPTIMIZATION," the contents of which are incorporated by reference herein in their entirety. It will similarly be appreciated that in some embodiments the optimization process 606 embodies or includes one or more other known optimization process(s) that generate optimized operational parameter(s) 608 that may be usable by a user or automatically to control operation of one or more physical component(s) in a processing plant to optimize one or more target parameter(s). In this regard, the optimization process 606 in some embodiments generates an amount of each target product to be produced over a particular time interval, for example the next m-days, without providing an order to produce such amounts. In some such embodiments, the user may interact with the apparatus 200 to set configuration setting(s) of one or more physical component(s) to produce a particular product via the physical components of the processing plant.

FIG. 7 illustrates a data flow for configuring operation of a physical component in accordance with at least one example embodiment of the present disclosure. In some embodiments, the configured operation of the physical component causes operation of the physical component in accordance with a particular operation, for example to operate the physical component in a manner that optimizes one or more target parameter(s) as indicated by one or more optimized operational parameter(s).

As illustrated, optimized operational parameter(s) 702 are utilized or otherwise applied to one or more control process(es) 704. In some embodiments, the optimized operational parameter(s) 702 includes at least one optimized operational parameter determined via one or more optimization process(es). In some embodiments, the optimized operational parameter(s) 702 represent optimized amounts of a plurality of final products to be produced via a processing plant over a particular timestamp interval to maximize one or more target parameter(s). The optimized operational parameter(s) 702 may be generated by, stored to, and/or otherwise maintained by the apparatus 200, for example generated as described with respect to FIG. 6 herein.

The control process(es) 704 embody, include, or otherwise initiate particular process(es) for controlling operation of a particular physical component or a plurality of physical components. In some embodiments, the control process(es) 704 generates particular control data 706 that causes a physical component to operate in a particular manner defined by the control data 706. For example, in some embodiments, a user inputs data via the control process(es) 704 that indicates a configurable mode to be activated on a particular physical component, causing the physical component to operate in accordance with the selected mode. In one example context, a user may provide particular user input that initiates the control process(es) 704, which generates control data 706 that configures a physical component to perform in accordance with a selected mode to generate a particular final product during a particular time slice.

In some embodiments, the control process(es) 704 are initiated via a particular user-facing interface associated with the processing plant. In some embodiments, the user-facing interface is generated by the apparatus 200 based at least in part on external representation data corresponding to the processing plant. In this regard, such user-facing interfaces may intuitively be utilized by the user for controlling the physical components of the associated processing plant, for example where the external representation data corresponds to the physical layout of the processing plant itself. Such improved and intuitive user interfaces enable visualization and control of the processing plant quickly, efficiently, and without new knowledge on the part of the user, while simultaneously enabling a corresponding internal representation data to be utilized to generate the at least one optimized operational parameter that may be utilized to define or inform how to operate the processing plant to optimize particular target parameter(s) in a computationally efficient and quick manner, as described herein.

As illustrated, the control data 706 is transmitted or otherwise provided to physical component 708. In some embodiments, the control data 706 is transmitted to the physical component 708 to cause the physical component to alter its configuration(s) and/or mode of operation. In this regard, the control data 706 in some embodiments causes operation of the physical component 708 in accordance with a particular selected mode, for example to produce a particular desired final product in the context of a batch blender.

It should be appreciated that a plurality of physical components may be updated at once. For example, in some embodiments, control data is transmitted and/or otherwise provided to a plurality of physical components embodying different batch blenders to configure the batch blenders to produce a particular final product during a particular time slice. In this regard, the operation of such multiple batch blenders enables simultaneous production of multiple products and/or the same products at the same time slice, for example to optimize in accordance with the optimized operational parameter(s) 702.

Example Processes of the Disclosure

Having described example systems and apparatuses, data representations and visualizations, and data flows in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 8 illustrates a flowchart including operations of an example process for processing multiple representations of a processing plant in accordance with at least one example embodiment of the present disclosure. Specifically, FIG. 8 depicts operations of an example process 800. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one physical component, at least one processing plant system, a scheduling system, and/or the like. For purposes of simplifying the description, the process 800 is described as performed by and from the perspective of the apparatus 200.

The process 800 optionally begins at operation 802. At optional operation 802, the apparatus 200 includes means such as the external representation management circuitry 210, internal representation management circuitry 212, visualization circuitry 214, optimization planning circuitry 216, control circuitry 218, the lift planning circuitry 220, the communications circuitry 208, the input/output circuitry 206, the processor 202, and/or the like, or a combination thereof, that enables input of a physical layout of a processing plant. In some embodiments, the apparatus 200 receives input representing the physical layout by a designer utilizing the apparatus 200. For example, the designer may utilize the apparatus 200 to design a flowsheet model that represents the physical layout. In some embodiments, the flowsheet model includes physical representations corresponding to each physical component of the processing plant based at least in part on a blueprint or other design of the processing plant. In other embodiments, an end user associated with the processing plant inputs the physical layout of the processing plant via the flowsheet model. In this regard, the designer may construct the external representation data via the apparatus 200 to a companion user device, where the external representation data represents the physical layout of the site (e.g., an oil refinery) based on the designer's knowledge, plan(s), and/or the like.

At operation 804, the apparatus 200 includes means such as the external representation management circuitry 210, internal representation management circuitry 212, visualization circuitry 214, optimization planning circuitry 216, control circuitry 218, the lift planning circuitry 220, the communications circuitry 208, the input/output circuitry 206, the processor 202, and/or the like, or a combination thereof, that identifies external representation data representing a physical layout of the processing plant. In some such embodiments, the external representation data includes a physical representation of a physical component of the processing plant. In some embodiments, the apparatus 200 identifies the external representation data from inputs at operation 802. Alternatively or additionally, in some embodiments the apparatus 200 identifies the external representation data from a datastore of the apparatus 200 that maintains the external representation data.

At operation 806, the apparatus 200 includes means such as the external representation management circuitry 210, internal representation management circuitry 212, visualization circuitry 214, optimization planning circuitry 216, control circuitry 218, the lift planning circuitry 220, the communications circuitry 208, the input/output circuitry 206, the processor 202, and/or the like, or a combination thereof, that automatically generates internal representation data corresponding to the processing plant. In some embodiments, the apparatus 200 automatically generates the internal representation data based at least in part on the external representation data. In some embodiments, the internal representation data include a plurality of virtual representations associated with each physical component of the processing plant. Additionally or alternatively, in some embodiments each virtual representation corresponds to a modal path of a plurality of modes operable via the physical component of the processing plant, for example where the modal path corresponds to production of a particular final product.

For example, in some embodiments, the apparatus 200 generates a virtual representation corresponding to each mode of the plurality of modes. In this regard, each virtual representation may represent a particular modal path that configures each upstream and/or downstream physical component for producing a particular final product. In the example context where the physical component embodies a batch blender, the plurality of modes corresponds to a particular final product producible via the batch blender. A virtual blender may be automatically generated in the internal representation data corresponding to each mode of the batch blender, such that a virtual blender corresponds to each mode and final product producible by the batch blender at a different time slices. For example, if a batch blender is configurable in a first mode to produce gasoline of a first octane, gasoline of a second octane, gasoline of a third octane, and diesel fuel, the physical component may correspond to four separate virtual representations—each virtual representation corresponding to a different final product. In this regard, it should be appreciated that each physical blender may produce a single final product at a given time, but that final products may be made across different time slices of a particular time interval (e.g., the next m-days).

At optional operation 808, the apparatus 200 includes means such as the external representation management circuitry 210, internal representation management circuitry 212, visualization circuitry 214, optimization planning circuitry 216, control circuitry 218, the lift planning circuitry 220, the communications circuitry 208, the input/output circuitry 206, the processor 202, and/or the like, or a combination thereof, that generates a user-facing interface based at least in part on the external representation data. In some embodiments, the user-facing interface includes at least one physical path associated with the physical representation of the physical component. In this regard, each physical connection between physical representations of physical components in the external representation data may be depicted within the user-facing interface. In some embodiments, the apparatus 200 generates a user-facing interface embodying a flowsheet model that defines the physical layout of the processing plant, including each physical path between the physical component and one or more other physical component(s) of the processing plant. By generating the user-facing interface based at least in part on the external representation data, the apparatus 200 enables depiction of the processing plant in an intuitive manner to an end user (e.g., a plant manager) to enable rapid discerning of the functioning of the processing plant, intuitive changes to the operation of the plant, and/or the like.

FIG. 9 illustrates a flowchart including operations of an example process for generating at least one optimized operational parameter and use of the optimized operational parameter in accordance with at least one example embodiment of the present disclosure. Specifically, FIG. 9 depicts operations of an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 900 is described as performed by and from the perspective of the apparatus 200.

The process 900 begins at operation 902. In some embodiments, the process 900 begins after one or more operations depicted and/or described with respect to any one of the other processes described herein. For example, in some embodiments as depicted, the process 900 begins after execution of operation 806. In this regard, some or all of the process 900 may replace or supplement one or more blocks depicted and/or described with respect to any of the processes described herein. Upon completion of the process 900, the flow of operations may terminate. Additionally or alternatively, as depicted, upon completion of the process 900 in some embodiments, flow may return to one or more operation(s) of another process, such as the operation 808. It will be appreciated that, in some embodiments, the process 900 embodies a sub-process of one or more other process(es) depicted and/or described herein, for example the process 800.

At operation 902, the apparatus 200 includes means such as the external representation management circuitry 210, internal representation management circuitry 212, visualization circuitry 214, optimization planning circuitry 216, control circuitry 218, the lift planning circuitry 220, the communications circuitry 208, the input/output circuitry 206, the processor 202, and/or the like, or a combination thereof, that generates at least one optimized operational parameter based at least in part on the internal representation data. In some embodiments, the at least one optimized operational parameter corresponds to at least the physical component of the processing plant. In some embodiments, the at least one optimized operational parameter represents or otherwise indicates an optimal amount of a particular product to be produced within a particular timestamp interval, for example over the next m-days. In some embodiments the at least one optimized operational parameter in a manner in which a particular target parameter is optimized, for example to maximize a target profit parameter resulting from distribution or other transaction of the final product(s) produced via the processing plant. In some embodiments, the optimized operational parameter is generated based at least in part on the number, type, and/or other information associated with the particular virtual representation(s) within the internal representation data.

In some embodiments, the at least one optimized operational parameter is generated utilizing one or more optimization process(es). In some embodiments, at least one of the at least one optimized operational parameter is generated utilizing a batch blender optimization process. In some embodiments, the batch blender optimization process optimizes the optimized operational parameters over a particular timestamp interval, for example the next m-days, when utilizing one or more batch blender(s) within a processing plant. In some embodiments, at least one of the at least one optimized operational parameter is generated utilizing a run-down blender optimization process. In some embodiments, the run-down blender optimization process optimizes the optimized operational parameters over a particular timestamp interval, for example the next m-days, when utilizing one or more run-down blenders. Alternatively or additionally, in some embodiments, the batch blender optimization process includes a sub-processes of a batch blender optimization process and a run-down optimization process, for example in circumstances where a processing plant includes physical components corresponding to each of at least one batch blender and at least one run-down blender.

By using the internal representation data to generate the at least one optimized operational parameter, embodiments of the present disclosure enable such optimization to be performed in a less computationally intensive manner, using less computing resources, and/or that reduces processing time. For example, by using the internal representation data including virtual representation(s) corresponding to a physical component capable of producing various final products (e.g., a batch blender with multiple modes), batch blending optimization process(es) may be leveraged that utilize this format for completing the process while removing consideration of additional complexity variables (e.g., time). Accordingly, the internal representation data may be used for improved generation of optimized operational parameter(s) alone or in conjunction with external representation data that may be rendered to provide an intuitive representation of the physical layout of the processing plant rather than the representation of the internal representation data, which may be less intuitive as not matching the physical layout of the processing plant. The internal representation data and external representation data represent the same fundamental physical components and configuration thereof, enabling embodiments of the present disclosure to perform translation to and/or from either representation to and/or from the other representation, and/or reflect updates to the configuration and/or operation of the processing plant in either representation.

At optional operation 904, the apparatus 200 includes means such as the external representation management circuitry 210, internal representation management circuitry 212, visualization circuitry 214, optimization planning circuitry 216, control circuitry 218, the lift planning circuitry 220, the communications circuitry 208, the input/output circuitry 206, the processor 202, and/or the like, or a combination thereof, that causes operation of at least the physical component based at least in part on the at least one optimized operational parameter. In some embodiments, the apparatus 200 enables a user to provide user input altering the configuration and/or operation of at least the physical component. In this regard, the user may input data to cause at least the physical component to operate in a manner that generates a particular desired final product based at least in part on the at least one optimized operational parameter. For example, in some embodiments the user configures at least the physical component to operate in a manner that generates an optimized amount of a final product represented by or derived from the at least one optimized operational parameter. In this regard, it will be appreciated that the operation of at least the physical component is based at least in part on the internal representation data processed to generate the at least one optimized operational parameter, as described herein, further optimizing the operation of the physical component itself.

In some embodiments, the apparatus 200 automatically configures at least the physical component based at least in part on the at least one optimized operational parameter. For example, in some embodiments, the apparatus 200 determines a final product to be produced at a current time slice based at least in part on the at least one optimized operational parameter, and configures at least the physical component for producing that final product.

At operation 906, the apparatus 200 includes means such as the external representation management circuitry 210, internal representation management circuitry 212, visualization circuitry 214, optimization planning circuitry 216, control circuitry 218, the lift planning circuitry 220, the communications circuitry 208, the input/output circuitry 206, the processor 202, and/or the like, or a combination thereof, that configures a lift schedule based at least in part on the at least one optimized operational parameter. In some embodiments, the apparatus 200 enables a user to provide user input for configuring the lift schedule. In this regard, the user may configure the lift schedule to allocate particular lifts at timestamp(s) or timestamp interval(s) that enables sufficient time before the scheduled lift to generate the final product(s) that are part of the lift based at least in part on the at least in optimized operational parameter. In this regard, it will be appreciated that the configuration of the lift schedule is based at least in part on the internal representation data processed to generate the at least one optimized operational parameter, as described herein, further optimizing the configuration of the lift schedule itself.

FIG. 10 illustrates a flowchart including operations of an example process for causing configuration of physical components in accordance with at least one example embodiment of the present disclosure. Specifically, FIG. 10 depicts operations of an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1000 is described as performed by and from the perspective of the apparatus 200.

The process 1000 begins at operation 1002. In some embodiments, the process 1000 begins after one or more operations depicted and/or described with respect to any one of the other processes described herein. For example, in some embodiments as depicted, the process 1000 begins after execution of operation 806. In this regard, some or all of the process 1000 may replace or supplement one or more blocks depicted and/or described with respect to any of the processes described herein. Upon completion of the process 1000, the flow of operations may terminate. Additionally or alternatively, as depicted, upon completion of the process 1000 in some embodiments, flow may return to one or more operation(s) of another process, such as the operation 808. It will be appreciated that, in some embodiments, the process 1000 embodies a sub-process of one or more other process(es) depicted and/or described herein, for example the process 800.

At operation 1002, the apparatus 200 includes means such as the external representation management circuitry 210, internal representation management circuitry 212, visualization circuitry 214, optimization planning circuitry 216, control circuitry 218, the lift planning circuitry 220, the communications circuitry 208, the input/output circuitry 206, the processor 202, and/or the like, or a combination thereof, that causes operation of the first physical component utilizing a batch blender optimization process. In some embodiments, the batch blender optimization process generates at least one optimized operational parameter based at least in part on the internal representation data. In some embodiments, the batch blender optimization process optimizes at least one target parameter based on use of batch blenders specifically. In this regard, the optimized operational parameter(s) generated thereby may represent the optimization of such target parameter(s) utilizing the batch blender(s) of the processing plant specifically. It should be appreciated that, in some embodiments, the processing plant includes one or more other blender(s) as well, for example one or more run-down blender(s) as described herein. In some embodiments, the apparatus 200 causes operation of at least the physical component based at least in part on the at least one optimized operational parameter as described with respect to operation 904, for example by configuring the physical component to operate in a manner that produces a particular final product based at least in part on the optimized operational parameter.

At operation 1004, the apparatus 200 includes means such as the external representation management circuitry 210, internal representation management circuitry 212, visualization circuitry 214, optimization planning circuitry 216, control circuitry 218, the lift planning circuitry 220, the communications circuitry 208, the input/output circuitry 206, the processor 202, and/or the like, or a combination thereof, that causes operation of the second physical component utilizing a run-down blender optimization process. In some embodiments, the run-down blender optimization process generates at least one optimized operational parameter based at least in part on the internal representation data. In some embodiments, the run-down blender optimization process optimizes at least one target parameter based on use of run-down blenders specifically. In this regard, the optimized operational parameter(s) generated thereby may represent the optimization of such target parameters) utilizing the run-down blender(s) of the processing plant specifically. It should be appreciated that, in some embodiments, the processing plant includes one or more other blender(s) as well, for example one or more batch blender(s) as described herein. In some embodiments, the apparatus 200 causes operation of at least the physical component based at least in part on the at least one optimized operational parameter as described with respect to operation 904, for example by configuring the physical component to operate in a manner that produces a particular final product based at least in part on the optimized operational parameter.

In some embodiments, the run-down blender optimization process differs from the batch blender optimization process. For example, in some embodiments, the batch blender optimization process generates the at least one optimized operational parameter in a single stage for a particular timestamp interval (e.g., the next m-days), whereas the run-down blender optimization process generates the optimized operational parameter in multiple stages (e.g., a long-term optimization and a short-term optimization).

CONCLUSION

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for processing multiple representations of a processing plant, the apparatus comprising at least one processor and at least one non-transitory memory including computer-coded instructions thereon, the computer coded instructions, with the at least one processor, cause the apparatus to:

identify external representation data representing a physical layout of the processing plant, wherein the external representation data comprises a physical representation of a physical component of the processing plant; and automatically generate internal representation data corresponding to the processing plant based at least in part on the external representation data, wherein the internal representation data comprises a plurality of virtual representations associated with the physical component of the processing plant, wherein each virtual representation corresponds to a flow of input and output products used by the physical component to produce a final product in a plurality of modes operable via the physical component of the processing plant;

generate at least one optimized operational parameter corresponding to the physical component of the processing plant based at least in part on the internal representation data; and automatically control, via a user-interface, the physical component of the processing plant based on the at least one optimized operational parameter.

2. The apparatus according to claim 1, the apparatus further caused to:

cause operation of the physical component based at least in part on the at least one optimized operational parameter.

3. The apparatus according to claim 1, the apparatus further caused to:

configure a lift schedule based at least in part on the at least one optimized operational parameter.

4. The apparatus according to claim 1, wherein the at least one optimized operational parameter corresponds to a plurality of optimized amounts comprising an optimized amount corresponding to each product to be generated at least in part via the physical component over a particular time interval.

5. The apparatus according to claim 1, wherein the processing plant comprises a plurality of physical components corresponding to a plurality of physical representations, wherein the internal representation data comprises a different plurality of virtual representations associated with each component of the plurality of physical components, the apparatus further caused to:

generate at least one optimized operational parameter corresponding to the plurality of physical components of the processing plant.

6. The apparatus according to claim 5, the apparatus further caused to:

cause operation of the plurality of physical components based at least in part on the at least one optimized operational parameter.

7. The apparatus according to claim 1, the apparatus further caused to:

generate a user-facing interface based at least in part on the external representation data, wherein the user-facing interface includes at least one physical path associated with the physical representation of the physical component.

8. The apparatus according to claim 1, wherein the physical component comprises a blender configurable to activate the plurality of modes associated with a batch blender.

9. The apparatus according to claim 1, wherein each modal path corresponds to a different product of a plurality of products generable via the physical component.

10. The apparatus according to claim 1, the apparatus further caused to:

control operation of at least the physical component via a mode of the plurality of modes at a plurality of time slices.

11. The apparatus according to claim 1, wherein each virtual representation of the plurality of virtual representations associated with the physical component comprises a virtual blender associated with a different product of a plurality of products generable via the physical component.

12. The apparatus according to claim 1, wherein the physical component embodies a crude flow unit.

13. The apparatus according to claim 1, wherein the physical component comprises a first physical component comprising a batch blender, wherein the processing plant comprises the first physical component and a second physical component comprising a run-down blender, the apparatus further caused to:

cause configuration of the first physical component utilizing a batch blender optimization process that generates at least one optimized operational parameter generated based at least in part on the internal representation data; and cause configuration of the second physical component utilizing a run-down blender optimization process, wherein the batch blender optimization process differs from the run-down blender optimization process.

14. The apparatus according to claim 1, wherein the external representation data is embodied as a flowsheet model.

15. A computer-implemented method for processing multiple representations of a processing plant comprising:

identifying external representation data representing a physical layout of the processing plant, wherein the external representation data comprises a physical representation of a physical component of the processing plant; and automatically generating internal representation data corresponding to the processing plant based at least in part on the external representation data, wherein the internal representation data comprises a plurality of virtual representations associated with the physical component of the processing plant, wherein each virtual representation corresponds to a flow of input and output products used by the physical component to produce a final product in a plurality of modes operable via the physical component of the processing plant;

generate at least one optimized operational parameter corresponding to the physical component of the processing plant based at least in part on the internal representation data; and control, via a user-interface, the physical component of the processing plant based on the at least one optimized operational parameter.

16. The computer-implemented method according to claim 15, wherein the processing plant comprises a plurality of physical components corresponding to a plurality of physical representations, wherein the internal representation data comprises a different plurality of virtual representations associated with each component of the plurality of physical components, the computer-implemented method further comprising:

generating at least one optimized operational parameter corresponding to the plurality of physical components of the processing plant.

17. The computer-implemented method according to claim 15, the computer-implemented method further comprising:

generating a user-facing interface based at least in part on the external representation data, wherein the user-facing interface includes at least one physical path associated with the physical representation of the physical component.

18. A computer program product for processing multiple representations of a processing plant comprising at least one non-transitory computer-readable storage medium having computer program code stored thereon that, in execution with at least one processor, configures the computer program product for:

identifying external representation data representing a physical layout of the processing plant, wherein the external representation data comprises a physical representation of a physical component of the processing plant; and automatically generating internal representation data corresponding to the processing plant based at least in part on the external representation data, wherein the internal representation data comprises a plurality of virtual representations associated with the physical component of the processing plant, wherein each virtual representation corresponds to a flow of input and output products used by the physical component to produce a final product in a plurality of modes operable via the physical component of the processing plant;

generate at least one optimized operational parameter corresponding to the physical component of the processing plant based at least in part on the internal representation data; and automatically control, via a user-interface, the physical component of the processing plant based on the at least one optimized operational parameter.

* * * * *